April 14, 1959  W. R. HULL ET AL  2,881,516
METHOD OF PREPARING AND HANDLING COATED SHEET MATERIAL
Filed June 15, 1954  2 Sheets-Sheet 1

INVENTORS
WILSON R. HULL
DENIS J. CAMPBELL JR.
BY Charles H. Erne
Leland R. McCann
George W. Reiber
ATTORNEYS

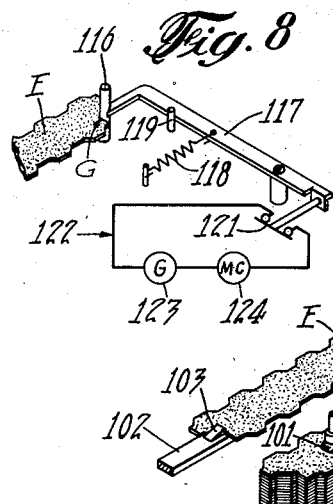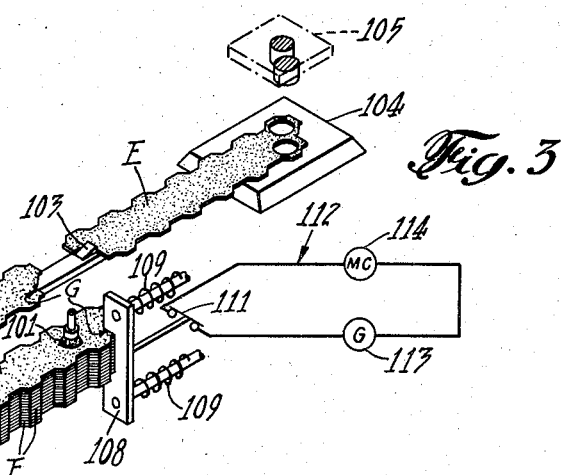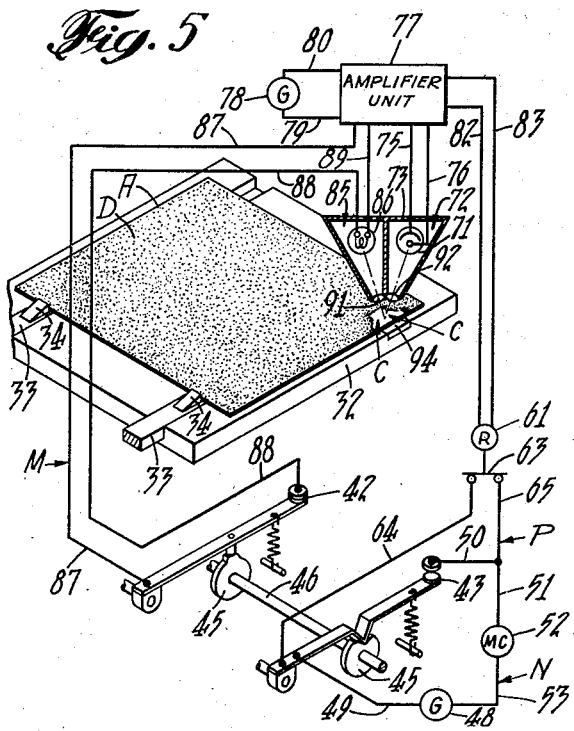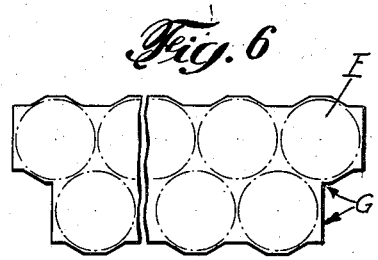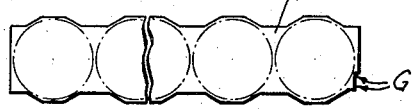
INVENTORS
WILSON R. HULL
DENIS J. CAMPBELL JR.
ATTORNEYS

United States Patent Office 2,881,516
Patented Apr. 14, 1959

2,881,516

METHOD OF PREPARING AND HANDLING COATED SHEET MATERIAL

Wilson R. Hull, Rye, N.Y., and Denis J. Campbell, Jr., Western Springs, Ill., assignors to American Can Company, New York, N.Y., a corporation of New Jersey Application June 15, 1954, Serial No. 436,864

8 Claims. (Cl. 29—407)

The present invention relates to a method of preparing and handling coated sheet material for the manufacture of can or container parts and other articles therefrom and has particular reference to detecting accidentally reversed sheets to insure manufacture of the articles with the proper coating on the proper surface of the article part.

The sheet material from which cans or containers and other articles are made is sometimes coated, on one or both surfaces, with a protective or decorative substance. In the case of metal sheets, such as tin plate and the like, the base metal, usually black iron or steel, may be protected on both surfaces with a film of tin, one surface carrying a heavier or thicker protective film than the other for special purposes. When both surfaces are coated identically such sheet material is usually coated with enamel, lacquer or other substances for special purposes. For a certain product the interior surfaces of the container parts require one kind of coating substance to protect the container from the product whereas the exterior surfaces may require a different coating substance to protect these outer surfaces from atmospheric or other outside conditions. The same requirements often apply to nonmetal sheet materials, such as fibrous and other materials.

When the coating substances on opposite sides of the sheet differ and are intended to meet certain requirements, such as one substance for interior surfaces and another for exterior surfaces, considerable difficulty is often experienced by an inadvertent reversal of the sheets during transfer from one manufacturing operation to another with the result that the finished article is produced with the exterior coating substance on the interior surfaces and the interior coating substance on the exterior surfaces. In the case of food products and beverages, this reversal of the coated surfaces sometimes results in spoilage of the container contents and is the cause of customer complaints and damage claims.

The instant invention contemplates overcoming these difficulties and has for its object the provision of a novel method of preparing and handling coated sheet material for the manufacture of can or container parts and other articles therefrom, wherein the material or any article containing division thereof is marked relative to a predetermined surface of the material for automatic detection throughout the various manufacturing and handling operations to insure manufacture of the articles with the proper coating substance on the proper material surfaces.

Another object is the provision of such a method of preparing and handling coated sheet material wherein a predetermined surface of each sheet as it is coated is provided with an identifying or detecting section or portion which is utilized during a subsequent operation to detect sheets in an accidentally reversed position to insure against operations on such reversed sheets to prevent manufacture of articles with the coating on the wrong surface.

Another object is the provision of such a method of preparing and handling coated sheet material wherein the identifying sections are preferably produced in waste portions of the material which are discarded during the manufacture of the articles.

Numerous other objects and advantages of the invention will be apparent as it is better understood from the following description, which, taken in connection with the accompanying drawings, discloses a preferred embodiment thereof.

Referring to the drawings:

Figures 1, 2 and 3 are schematic perspective views illustrating sheet material in various stages of manufacture and one form of apparatus for preparing and handling the sheet material for the manufacture of articles therefrom in accordance with the method steps of the instant invention, parts of the apparatus being broken away, with Figs. 2 and 3 including wiring diagrams of electrical equipment used in the apparatus;

Fig. 4 is an enlarged perspective view of an exemplary type of article manufactured in accordance with the steps of the instant method invention, part of the article being broken away and shown in section;

Fig. 5 is a schematic view including a wiring diagram of a modified form of the apparatus and its electric equipment shown in Fig. 2;

Figs. 6 and 7 are plan views of portions of the sheet material severed as an incident in the manufacture of articles therefrom and illustrating the location of potential articles to be produced from the severed portions; and Fig. 8 is a schematic perspective view including a wiring diagram of a modified form of the apparatus and its electric equipment shown in Fig. 3.

Figure 1:
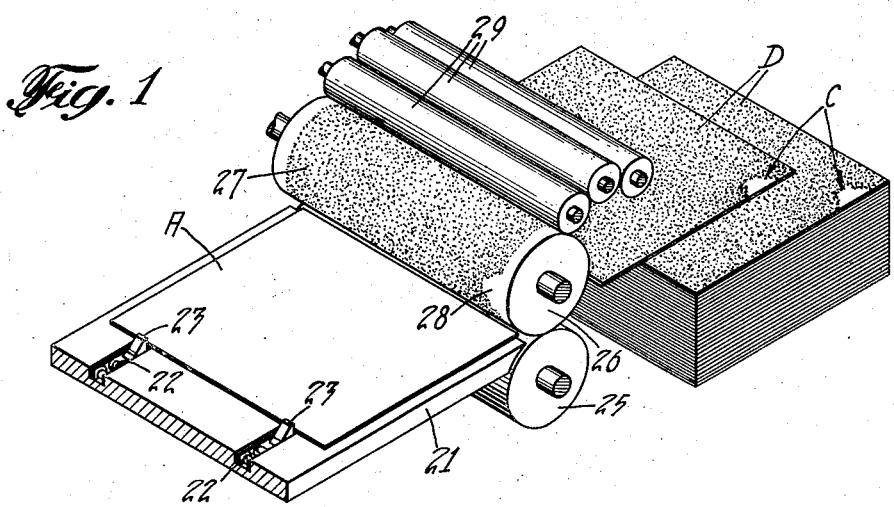

As a preferred or exemplary embodiment of the instant method invention the drawings illustrate the method steps of preparing and handling sheets A (Fig. 1) of tinplate, black plate or the like material from which are made can or container parts such as closure members or ends B (Fig. 4) preferably having a predetermined coating substance on the interior surface thereof to protect the ends from the can contents and having a different predetermined coating substance on the exterior surface thereof to protect the ends from outside conditions.

In some cases the sheets A may be coated with tin or other suitable coating metal alone, the coating on one side of the sheet being thicker and heavier than on the other side for special purposes. Usually the more heavily coated surface of the sheet is used on the inside of the can parts made from the sheet to protect them from the contents of the container when filled. In order to distinguish one surface from the other the steel mill polishes the outer coated surface and leaves the inner coated opposite surface unpolished which gives it a dull frosted appearance.

In other cases, black iron or tin coated sheets are coated on one or both surfaces with a substance such as lacquer or enamel of various kinds for special purposes. In such cases a tin coated sheet may be left with its original tin coating on one surface for use as the outside of the container and a special lacquer or enamel on the other side for use as the inside of the container, or the sheet may have different additional coatings on both sides, one especially for outside use and another for inside use. When black iron sheets are used, both sides are usually coated with lacquer or enamel. In any event the coatings on the two sides of the sheet are usually different and it is essential in manufacturing operations, where many operations are performed on the sheets and frequent transfers from one set of machines to another are required, that the sheets be maintained in a proper relation regarding a predetermined surface so that the finished article will have the proper coating on the proper surface. In the manufacture of can ends, the sheets preferably are fed through the various machines with the outside coated surface facing upwardly or on top.

The instant invention contemplates a method of preparing and handling these sheets so as to prevent manufacture of container parts from sheets which may become inadvertently reversed during transfer from one operation to the next so as to guard against manufacture of can parts with the wrong coating on the wrong surfaces of the parts.

This method broadly comprises the steps of providing an identification mark selectively disposed relative to a predetermined surface of a sheet, utilizing this identification mark after transfer of the sheets and before a subsequent operation to detect reversal of all of the sheets or any one of them so that the reversed sheets can be removed before any work is done on them to insure that the finished article whether the ultimate article or an article produced as an intermediate operation, is provided with the proper coating substance on the proper surface. For the purposes of this specification, the term identification mark is intended to cover any device, such as a coated or uncoated area or spot, or a notch or tab formed in the edge of a sheet, which is disposed in a selective or specific position relative to a particular surface of a sheet and which can be utilized to determine whether the sheet is normally disposed or has been inadvertently reversed during handling or transfer from one machine to another.

More specifically as in the case of a lacquer or enamel coating applied to one or both sides of sheets from which can ends B (Fig. 4) are to be produced, an identifying mark such as an uncoated area C (Figs. 1, 2 and 5) in a film of coating substance D on one side of the sheet is provided during the application of the coating substance to this side of the sheet. The identifying mark C preferably is located in a waste portion of the sheet so that it in no way interferes with or is incorporated into the finished can ends B and is further located in an asymmetrical relation to the sheet so that it can be disposed in a designated position only when the sheet is properly positioned during a manufacturing operation.

Following this coating step, the coating substance D on the sheets A is allowed to dry. When dry the coated sheets preferably are stacked and transferred into position for a shearing operation which divides the sheets into strips E (Figs. 2, 3, 6 and 7). The strips are designed to contain a predetermined number of potential can ends B to be cut therefrom. In some cases a strip will contain a double row of can ends as shown in Fig. 6 and in other cases each strip will contain a single row as illustrated in Fig. 7. In most cases the strips are cut to obtain the greatest number of can ends from a sheet. For this reason the can end spaces are staggered and hence the strips are cut with undulated or scrolled edges.

In order to insure that the proper coating substance D is on the proper surface of the strips E when cut, the identifying mark or uncoated area C is utilized as a detector spot during the feeding of the sheets A into position for cutting. Accordingly as the next step in the method, detection of the identifying mark C is effected immediately prior to the strip cutting step. If the mark is properly positioned and detected, the correct side of the sheet is in proper position for cutting and hence the cutting operation proceeds. Otherwise nondetection or misposition of the identifying mark indicates the sheet is in reversed order i.e. is upside down, and must be removed before the cutting can take place.

The cutting of the sheet A into strips E removes the identifying mark because of the removal of the waste pieces at the ends of the short row of potential can ends in the stagger layout. In order to continue proper control over the location of the originally identified coated surface, a new identification mark is provided on the strips simultaneously with their severance from the sheets for use in subsequent operations. This is brought about by the cutting of a registration notch G in the strips at one end thereof.

In the case of the double row strips shown in Fig. 6, the notch G is provided by removal of the recovery piece at the end of the short row of potential can ends B. However in these double row strips a recovery piece is removed from both ends of the short row. To distinguish one end from the other, the notch G at the right hand end of the strip as viewed in Fig. 6 is cut deeper than the notch at the left hand end. This provides a lesser amount of material between the cut edge of the can end B and the edge of the notch at the right hand end than at the left hand end and thus gives the strip an asymmetrical contour.

In the case of the single row strip shown in Fig. 7 the notch G cut in the right hand end of the strip provides for less material between the cut edge of the can end and the edge of the notch at the right hand end than at the left hand end where the end of the strip is straight and unnotched. This provision of a notch at only one end of the strip gives the strip an asymmetrical contour.

The asymmetry of the strips E is provided in a predetermined relation to the controlling coated surface of the sheets A being worked upon and is used for detection of the notches G when in a predetermined position so that if in any case a strip is reversed end for end or side for side, the notch G will fall in a position other than the predetermined position and will thus indicate a reversed strip which must be removed before the potential can ends can be cut from the strip. If the notch is in the correct position, the proper coated surface of the strip is in proper position and the strips are fed into place for removal of the can ends B.

By thus controlling the position of a sheet through its various stages of conversion into a finished article, in respect to a predetermined coated surface of the sheet, as determined through the identification of the surface at the various stages of treatment, full control may be had over the sheet irrespective of human frailties, with the result that the finished can end is produced with the proper coating or coatings on its exterior and interior surfaces.

Figure 2:
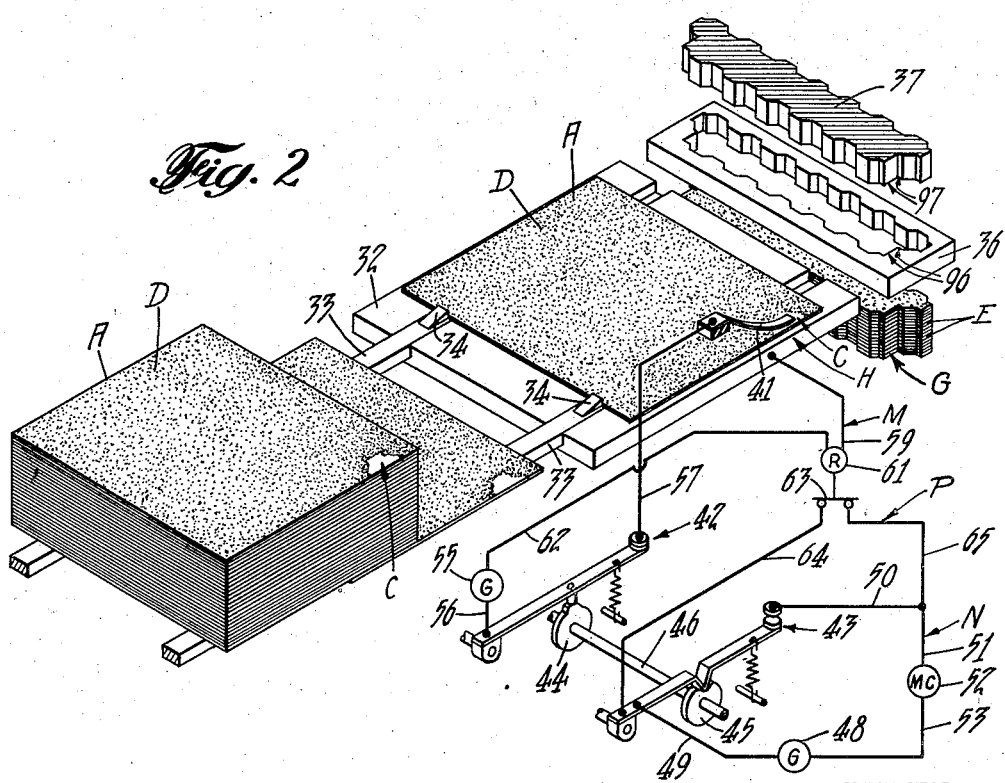

One form of apparatus for carrying out the above method steps is illustrated in Figs. 1, 2 and 3. In this form of apparatus the sheets A are coated on one surface and the surface identified, in a conventional lithographing or coating machine of the character disclosed in United States Patent 1,672,842 issued June 5, 1928 to C. Wagner, et al. on Coating Machine. In this machine, principal parts of which are shown in Fig. 1, the sheets A are received, from any suitable source of supply, on a feed table 21 across which the sheets are advanced individually by a pair of spaced and parallel endless chain conveyors 22 having feed dogs 23 which engage behind the rear edges of the sheets. The conveyors 22 advance the sheets into the grip of a pair of rotating cylinders, designated as a lower or pressure cylinder 25 and an upper or impression cylinder 26.

The cylinders 25, 26 are rotated continuously in time with the conveyors 22 in any suiable manner such as disclosed in the above mentioned Wagner patent. The upper cylinder 26 carries on its outer surface an impression blanket or etched portion 27 which is adapted to hold and apply the coating substance to the sheets A. This blanket or etched area 27 includes a portion 28 which for example is left unetched or is relieved or depressed so as to provide the identifying mark or uncoated area C on the sheet A. The coating substance is applied to the impression cylinder 26 by a series of conventional supply rollers 29 as shown in the Wagner patent.

Hence when a sheet A is fed into the grip of the cylinders 25, 26, the cylinders pass the sheet between them and thus impress the film D of the coating substance on a surface of the sheet and simultaneously provide the identifying area C as mentioned hereinbefore. In the instant case the film D of coating substance is applied to the top or uppermost surface of the sheet and the identification area C is provided on the same surface at a predetermined asymmetrical location therein. This uppermost newly coated surface, as disclosed, is designated as the surface to be on the outside of the can parts to be made from these sheets, and the area C identifies this surface as such.

The opposite surface of the sheets may or may not be coated, as desired. In the instant case, however, where the sheets A are to be used to produce can ends B, the lower surface of the sheets which is intended to be located inside the containers, preferably is precoated with a suitable substance to protect the can end interior surface. Upon application of the film D of coating substance to the sheets A the sheets are allowed to dry, for example by passage through a conventional drying oven or by exposure to the air or other heat treatment.

After being dried, the sheets A are transferred to a conventional scroll shear, principal parts of which are shown in Fig. 2, for the purpose of cutting the sheets into the strips E as a manufacturing incident in the production of the can ends B. The shear preferably is of the character disclosed in United States Patent 1,920,999, issued August 8, 1933 to John H. Murch on Shearing Machine. In this scroll shear, the sheets A are propelled individually across a support table 32 (Fig. 2) by a pair of spaced and parallel reciprocable feed bars 33, disposed in the table 32 and carrying feed dogs 34 which engage against the rear edge of the individual sheets. The feed bars 33 are reciprocated in any suitable manner in time with the other moving parts of the shear as disclosed in the above mentioned Murch Patent 1,920,999.)

Reciprocation of the feed bars 33 advances the sheet A intermittently through a step-by-step advancement into a shearing mechanism which comprises a lower stationary die 36 and an upper vertically reciprocable punch 37 between which the sheet is introduced for severance of the strips E. This shearing mechanism is actuated in the manner disclosed in the above mentioned Murch Patent 1,920,999.

A detecting device is provided in the scroll shear to detect any sheets A that, through transfer of the sheets from the coating machine to the shear, have become inadvertently reversed and are fed into the shear in this wrong position. For this purpose the scroll shear is equipped with a feeler finger or probe 41 (Fig. 2) which engages against a sheet advancing toward the shearing mechanism and which is located above the table 32 at a detecting station H where the surface identifying area C stops during its intermittent travel across the table or in some cases may merely pass through without stopping. The feeler 41 is part of an electric detector circuit M which effects stoppage of the shear if a sheet A is in reversed position, so that the inverted sheet may be removed and the remaining sheets in the stack inspected thereby preventing can ends B from being produced with the wrong coatings on the wrong surfaces of the can ends.

The detector circuit M is controlled by a normally open, cam actuated, electric detector switch 42 which cooperates with a normally closed, cam actuated, electric machine switch 43 in a machine operating circuit N, to keep the machine running during normal operation as when properly positioned sheets are advancing through the machine or when no sheets are fed for advancement. The switches 42, 43 are opened and closed by respective edge cams 44, 45 mounted on a shaft 46 which is rotated in any suitable manner in time with the other moving parts of the shear so that the shaft 46 makes one revolution for each sheet A.

When the machine switch 43 is closed by its cam 45, electric current flows through the machine circuit N from a source of current such as a generator 48 along a connecting wire 49, closed switch 43, wires 50, 51 connecting with a magnetic clutch 52, and a wire 53 returning to the generator. Electric current flowing through this circuit energizes the magnetic clutch 52 and thereby effects operation of the shear through its main source of power, to advance a sheet A toward the die mechanism for the strip cutting operation. At a predetermined time in the cycle of operation of the shear, when the surface identifying area C on a properly positioned advancing sheet should be at the detecting station H, the cam 45 opens the machine switch 43 and the cam 44 closes the detector switch 42, the detector switch 42 being closed just a little ahead of the opening of the machine switch 43.

If the sheet A is right side up, as it should be, the identifying area C on the coated sheet registers with the detector feeler 41 and causes electric current from a source of current such as a generator 55 in the detector circuit M, to flow through this circuit and thus keep the magnetic clutch 52 energized to maintain the machine in operation until the identifying area C passes out of range of the feeler 41. The current flows from the generator 55 along a connecting wire 56, through closed detector switch 42, a connecting wire 57, detector feeler 41, then enters sheet A through the uncoated identifying area C and flows through the sheet to the feed dog 34 of the feed bar 33 at the rear edge of the sheet table 32. The current then flows through the feed bar 33, the table 32, connecting wire 59 to and through a relay 61, and wire 62 returning to the generator. Current flowing through this detector circuit M energizes the relay 61 and this closes a normally open relay switch 63 in a holding circuit P which is connected by wires 64, 65 into the machine circuit N as shown in Fig. 2 to cut out or by-pass the open machine switch 43.

Thus when a sheet A is in proper position for advancement into the die mechanism, with the proper surface facing upward, the closing of the detector switch 42 keeps the shear in operation while the machine switch 43 is open. However if the sheet A is in reverse position, the identifying area C, due to its asymmetrical location on the sheet will never register with the detecting feeler 41 at the detecting station H when the machine switch 43 is open and hence during the detecting period when the machine switch 43 is open and the detector switch 42 is closed, the feeler 41 will be in engagement with a non-conducting coated portion of the sheet and hence insulated from its circuit M. This prevents the flow of current through the closed detector switch 42 with the result that the holding circuit P will remain open and the machine operating circuit N will be broken. The magnetic clutch 52 is thus deenergized and disconnected from the machine power source and the machine stops for the removal of the reversed sheet A.

When for some reason no sheet A is in place to be advanced into the die mechanism, the feeler 41 engages against the top of the table 32 and hence during the detecting period when the machine switch 43 is open, the feeler 41 through the table 32 establishes the detector circuit M when the detector switch 42 closes, to energize the relay 61 as for normal sheets and thus keeps the machine circuit N in closed condition to keep the machine running.

When plain tin coated sheets, having a thicker tin coating on one side, as mentioned hereinbefore, are being operated on in the shear, the detecting device is modified as shown in Fig. 5 to include a photoelectric cell 71 for detecting purposes. In feeding such sheets, the polished surface of the sheets is maintained in the uppermost position and is utilized by the photoelectric cell to detect reversed sheets. The photoelectric cell 71 is contained in a closed compartment 72 of a housing 73 located above the table 32, at the detecting station H. This photoelectric cell 71 is connected by wires 75, 76 to a conventional current amplifying unit 77 which receives electric current from a generator 78 connected to the unit by lead wires 79, 80. The unit is also connected by wires 82, 83 to the relay 61 which opens and closes the normally open electric switch 63 in the holding circuit P.

The housing 73 is further formed with a closed compartment 85 which encloses a source of light 86 connected by wires 87, 88, 89 to the lead wires 79, 80 in the amplifying unit 77 and to the normally open detector switch 42. During the detecting period when the detector switch 42 is closed and the machine switch 43 is open, current flows through the light source 86 which produces a beam of light which is projected by a lens 91 onto the sheet A. If the sheet surface is in proper position, i.e. with the polished surface uppermost, the beam of light is reflected by the sheet into a receiving lens 92 which projects it onto the photoelectric cell 71. The cell 71, through the amplifying unit 77 energizes the relay 61 and closes the relay switch 62 to establish the holding circuit P and maintain the machine circuit N as in the preferred form of detecting device.

If the dull or frosted side of the sheet is uppermost, as when the sheet is in a reversed position, the light beam from the light 86 is absorbed by the sheet surface and hence the photoelectric cell 71 is not activated with the result the relay is not energized and the open relay switch 63 permits the machine circuit N to open and thus stop the machine for removal of the reversed sheet. In order to continue operation of the shear when no sheet is advanced into detecting position, a polished block 94 is provided in the table 32 at the detecting station H to receive and reflect the light beam during the detecting period and thus provide for the normal energization of the relay 61.

Sheets A having the proper coated surface uppermost upon reaching the detecting station H continue their advancement into the shearing mechanism where they are cut into the strips E by the die 36 and cooperating punch 37 as hereinbefore mentioned. In this shearing operation, the identifying area C, being in a waste area of the sheet, is cut out and is thus lost as a sheet surface identification for subsequent operations. In order to continue identification of the sheet surface the identifying or registration notch G hereinbefore mentioned is cut in the ends of the strips E while the proper surface of the sheet is in uppermost position in the machine. The cutting of the notch G in the strips is effected during the strip cutting operation. For this purpose the die 36 and the punch 37 are provided with notch forming cutting edges 96, 97 respectively.

Following the strip cutting operation, the strips E are transferred to a conventional strip feed press (Fig. 3) where the strips are fed individually from a stack of such strips, into a die mechanism which punches or cuts the can ends B from the strips, leaving only a skeleton strip which is discarded. Such a strip feed press, principal parts of which are shown in Fig. 3, is disclosed in United States Patent 1,443,761 issued January 30, 1923 to H. Schoendelen on Safety Device for Punch Presses and the Like.

In such a strip feed press, the strips E are stacked in a magazine from which they are removed individually by vacuum cups 101 (Fig. 3) and positioned onto a reciprocating feed bar 102 having feed dogs 103 which engage behind the rear end of the positioned strip and advance it step-by-step into place between a lower cutting and forming die 104 and an upper vertically reciprocable cooperating punch 105. The die 104 and punch 105 preferably cut out and simultaneously form into shape two can ends B from diagonally disposed potential can end spaces in the advanced strips. The completed can ends B fall from the bottom of the die for subsequent edge curling, compound lining, and attachment to cans or containers.

In order to insure that the strips E are fed into the machine with the proper coated surface uppermost so as to produce the can ends B with the proper coated surfaces arranged interiorly and exteriorly of the can ends, provision is made in the magazine to utilize the asymmetrically located notch G so that the strips can be stacked in the magazine in only one way, which way is with the proper coated surface uppermost. For this purpose, the magazine is provided with an identifying bar 108, which occupies the space provided by the notches G. The bar 108 is backed up by compression springs 109 to render the bar yieldable and is connected to a normally closed electric switch 111 which forms a part of a normally closed electric circuit 112 including a source of current such as a generator 113 and a magnetic clutch 114 which connects a source of power to the press.

Hence when the strips E are loaded into the magazine, they fit, in only one way, without shifting the yieldable identifying bar 108. If reversed, end-for-end, or side-for-side, the asymmetrically located notches G will not align with the identifying bar 108, and the bar will be displaced outwardly and open the electric switch 111 if the strips are forced into the magazine in such a reversed position. The opening of the switch 111 breaks the operating circuit 112 and thus deenergizes the magnetic clutch 114, disconnecting it from the machine power and causing the machine to stop for removal and correct positioning of the strips in the magazine.

As a modified form of this detecting device, Fig. 8 illustrates a detecting finger 116 which is disposed in the strip magazine adjacent the location of the notches G of strips E properly positioned in the magazine. This detecting finger 116 is carried on a pivotally mounted arm 117 which is yieldably held by a spring 118 against a stop pin 119 to retain the detecting finger 116 in proper detecting position. The arm 117 engages against the movable element of a normally closed electric switch 121 in a normally closed electric circuit 122 which is similar in construction and operation to the circuit 112 above explained and which like this circuit includes a generator 123 and a magnetic clutch 124.

The pivotally mounted detecting finger 116 is slightly more sensitive than the identifying bar 108 but operates in the same manner to detect reversed strips in the magazine and thus open the switch 121 when forced outwardly by a reversed strip, to break the operating circuit 122 and stop the press so that the reversed strip or strips can be removed.

Although in the above preferred or exemplary embodiment of the invention, the uncoated area or identifying mark C is described as being in the side of the sheet that usually faces upwardly during passage of the sheets through the various machines, it should be understood that the invention is equally well adapted to sheets fed through the machines with the side bearing the identifying mark C facing downwardly. In this latter case, the detecting elements would be located under the path of travel of the sheets instead of above this path of travel, a requirement which in no way affects the instant method invention.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

We claim:

1. A method of preparing and handling coated sheet material to secure proper location of coated surfaces in articles produced from said material, comprising the steps of applying a coating substance to a surface of said sheet material for incorporation in an article in a predetermined relation thereto while leaving uncoated a predetermined identifying area on said surface, feeding said coated sheet material along a predetermined path of travel for a manufacturing operation, testing said fed sheet material prior to said manufacturing operation for proper relative location of said uncoated identifying area on said surface to detect inadvertent misplacement of said material and thereby prevent manufacture of articles from said misplaced material, cutting said coated sheet material in relation to said coated surface and its uncoated identifying area into asymmetrically shaped portions to identify the relative location of said coated surface for a subsequent manufacturing operation, and utilizing the asymmetry of said cut portions to locate said cut portions in proper position relative to said coated surface for the manufacture of articles therefrom.

2. A method of preparing and handling coated sheet material to secure proper location of coated surfaces in articles produced from said material, comprising the steps of applying a coating substance to a surface of said sheet material for incorporation in an article in a predetermined relation thereto, while leaving uncoated a predetermined identifying area on said surface, utilizing said identifying area on said sheet material to determine proper positioning of said sheet material relative to said coated surface for a manufacturing operation, cutting said properly positioned material into strips while simultaneously providing on each cut strip an identification area to subsequently identify the location of said coated surface on each strip for a further subsequent manufacturing operation.

3. A method of preparing and handling sheets to ensure the proper disposition of sheet surfaces preassigned to a specified position in articles produced therefrom, comprising providing said sheet with a preassigned surface which is identifiable from its reverse side one of said sides having an identification area, feeding said sheets toward the operating station of a cutting machine, testing each of said sheets for said identification area as an incident to said feeding to detect the inadvertent reversal of said sheet, cutting into subdivisions only those sheets having properly positioned identification areas and, as an incident to said cutting operation, providing each of said subdivisions with an identificaton device selectively positioned with respect to its said identification area, utilizing said identification device in a subsequent machine to detect the inadvertent reversal of said subdivision, and forming articles in said subsequent machine from properly positioned subdivisions wherein said preassigned surface is properly disposed.

4. A method of preparing and handling sheets to ensure the proper disposition of sheet surfaces preassigned to a specified position in articles produced therefrom, comprising coating a surface of each sheet but leaving an uncoated identification spot at a predetermined position on said surface, individually feeding said coated sheets towards an operating station of a machine, testing each of said sheets while it is being fed toward said operating station for the presence of said uncoated identification spot at a designated position to detect the inadvertent reversal of said sheet, preventing each sheet having said identification spot improperly positioned from being operated upon by said machine at said operating station, and feeding each sheet having said identification spot properly positioned to said operating station.

5. The method of claim 4 in which each sheet is photoelectrically scanned, as an incident to being fed to the feeding station of said machine, to test for the presence of its uncoated identification spot at said designated position.

6. A method of preparing and handling sheets to ensure the proper disposition of sheet surfaces preassigned to a specified position in articles produced therefrom, comprising coating a preassigned surface of each sheet but leaving an uncoated identification spot in a predetermined waste area on said preassigned surface, coating the reverse surface of each sheet without a said identification spot individually feeding said sheets toward an operating station of said machine, testing each of said sheets while it is being fed toward said operating station for the presence of said uncoated identification spot at a designated position in the path of said sheets to detect the inadvertent misplaced or reversal of said sheet, preventing each of said sheets thus detected as improperly placed or reversed from being operated upon by said machine at said operating station, and feeding each sheet having said identification spot present at said designated position to said operating station.

7. A method of preparing and handling sheets to ensure the proper disposition of sheet surfaces preassigned to a specified position in articles produced therefrom, comprising coating a portion of said preassigned surface of each sheet but leaving an identification area on said preassigned surface, transporting said sheets to the feeding station of a subdividing machine, individually feeding said sheets towards the subdividing station of said machine, testing each of said sheets while it is being fed toward said operating station for the presence of said identification area at a designated position to determine the inadvertent reversal of said sheet, subjecting only properly positioned sheets to a subdividing operation at said station for severance into subdivisions, and simultaneously with said operation, providing each of said subdivisions with a registration notch selectively positioned with respect to said preassigned surface, utilizing said notch in a subsequent machine to detect the inadvertent reversal of said subdivision, and performing an operation in said subsequent machine only upon those subdivisions having properly positioned notches.

8. A method of preparing and handling sheets to ensure the proper disposition of sheet surfaces preassigned to a specified position in articles produced therefrom, comprising coating a preassigned surface of each of said sheets to provide the greater portion of said surface with an insulating coating material while leaving a portion of said preassigned surface uncoated to provide an identification area at a predetermined position on said surface, coating the reverse surface of each of said sheets with an insulating coating material, transporting said coated sheets to the feeding station of a strip cutting machine, individually feeding said sheets towards the cutting station of said strip cutting machine, electrically probing each of said sheets as it is being fed to said cutting station to test for the presence of said uncoated identification area at a designated position to detect the inadvertent reversal of each sheet, continuing the feeding of only properly positioned sheets to said cutting station, cutting each of said latter sheets into individual strips and simultaneously, as an incident to said cutting operation, providing each of said strips with a registration notch selectively positioned with respect to said preassigned surface, transporting said cut strips to an article forming machine, testing each strip for the presence of its registration notch at a designated position to thereby detect the inadvertent reversal of the strip, and feeding only those strips having properly positioned notches through said article forming machine for forming said strips into articles having said preassigned surface properly disposed.

References Cited in the file of this patent

UNITED STATES PATENTS

| | | |
|---|---|---|
| 918,813 | Armstrong | Apr. 20, 1909 |
| 2,002,374 | King | May 21, 1935 |
| 2,069,424 | Seft | Feb. 2, 1937 |
| 2,167,357 | George | July 25, 1939 |
| 2,378,041 | Sebell | June 12, 1945 |
| 2,665,473 | Wilckens | Jan. 12, 1954 |